US00H002204H

(19) United States

(12) Statutory Invention Registration

Smay et al.

(10) Reg. No.: US H2204 H

(43) Published: Oct. 2, 2007

(54) CONTAINER

(75) Inventors: Cathy O. Smay, Newburgh, IN (US); Robin Wiggins, Newburgh, IN (US)

(73) Assignee: Bristol-Myers Squibb Company, Princeton, NJ (US)

(21) Appl. No.: 29/206,084

(22) Filed: May 26, 2004

(51) LOC (8) Cl. ..... 09-01

(52) U.S. Cl. ..... D9/560

(58) Field of Classification Search ..... D9/560
See application file for complete search history.

(56) References Cited

U.S. PATENT DOCUMENTS

| | | | | |
|---|---|---|---|---|
| 1,607,865 | A | 11/1926 | Butler | |
| 1,703,185 | A | 2/1929 | White | |
| 3,448,888 | A | 6/1969 | Smith et al. | 220/60 |
| 3,679,093 | A | 7/1972 | Chang | 220/90.2 |
| 3,722,779 | A | 3/1973 | Chang | 229/1.5 C |
| 3,874,554 | A | 4/1975 | Chang | 220/90.2 |
| 4,113,095 | A | 9/1978 | Dietz et al. | 206/508 |
| D261,234 | S | 10/1981 | Abraham | D9/432 |
| 4,300,700 | A | 11/1981 | Chang | 220/257 |
| D289,262 | S | 4/1987 | Goetz et al. | D9/424 |
| 4,844,263 | A | 7/1989 | Hadtke | 206/508 |
| D308,941 | S | 7/1990 | Kong | D9/416 |
| D311,334 | S | 10/1990 | Flyn et al. | D9/424 |
| 5,012,928 | A | 5/1991 | Proffit et al. | 206/508 |
| 5,392,945 | A | 2/1995 | Syrek | 220/608 |
| D356,255 | S | 3/1995 | Syrek | D9/424 |
| D361,036 | S | 8/1995 | Krupa | D9/423 |
| 5,507,389 | A | 4/1996 | Syrek | 206/508 |
| D371,962 | S | 7/1996 | Petruzzi | D9/423 |
| 5,647,413 | A | 7/1997 | Horrell | 141/108 |
| D387,982 | S | 12/1997 | Kaplan | D9/423 |
| 5,699,925 | A | 12/1997 | Petruzzi | 220/4.27 |
| 5,730,311 | A | 3/1998 | Curtis | 206/508 |
| 6,021,903 | A | 2/2000 | Hanson | 206/541 |
| D427,769 | S | 7/2000 | Zimmerman | D9/424 |
| 6,152,318 | A | 11/2000 | Walker | 206/508 |
| D459,124 | S | 6/2002 | Le et al. | D6/518 |

*Primary Examiner*—M. Clement

(74) *Attorney, Agent, or Firm*—Nelson Mullins Riley & Scarborough, LLP

(57) CLAIM

The ornamental design of a container, substantially as shown and described.

DESCRIPTION

1 Claim, 2 Drawing Sheets

Figure 1:
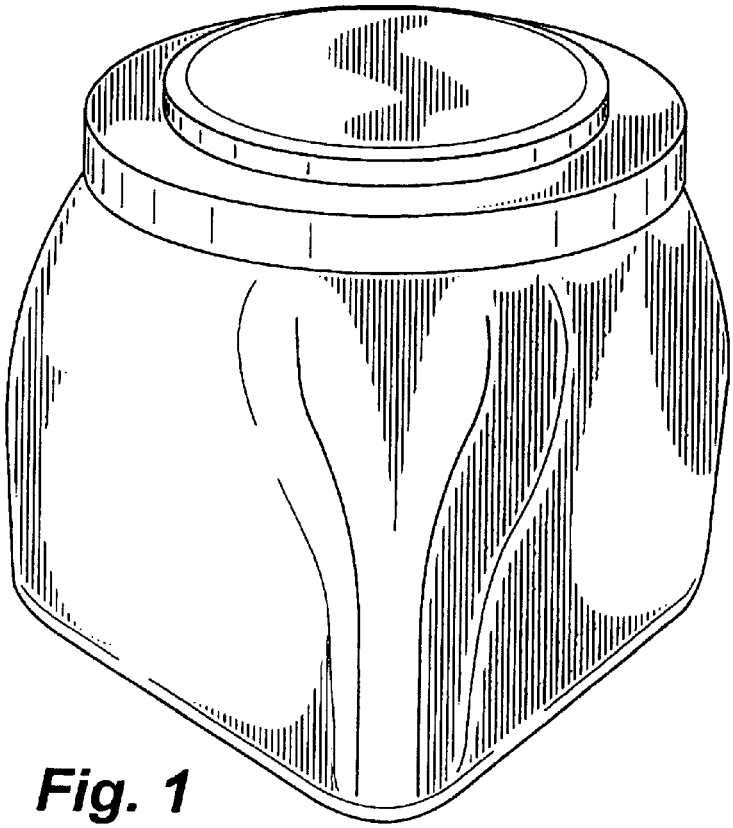
FIG. 1 is a perspective view of a container embodying the design of the present invention.
Figure 2:
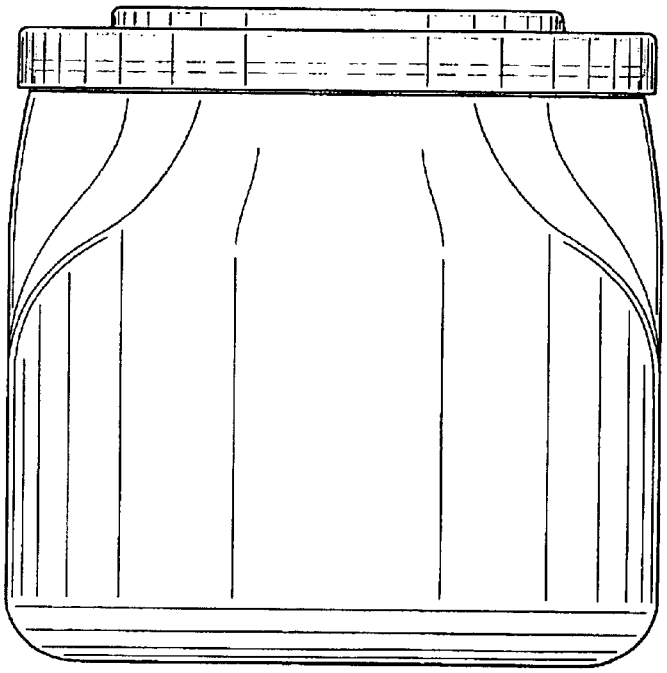
FIG. 2 is a front elevational view of the container illustrated in FIG. 1, the rear view and side views being a mirror image of the front view.
Figure 3:
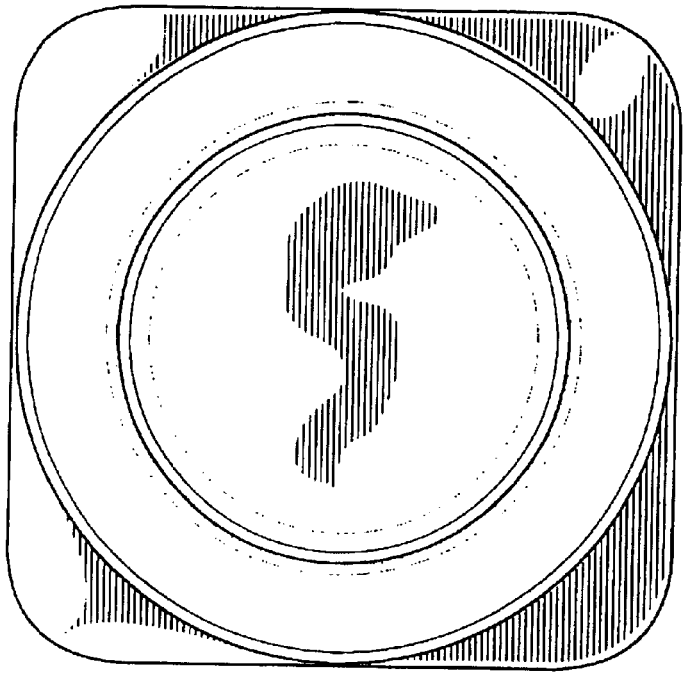
FIG. 3 is a top view of the container illustrated in FIG. 1.
Figure 4:
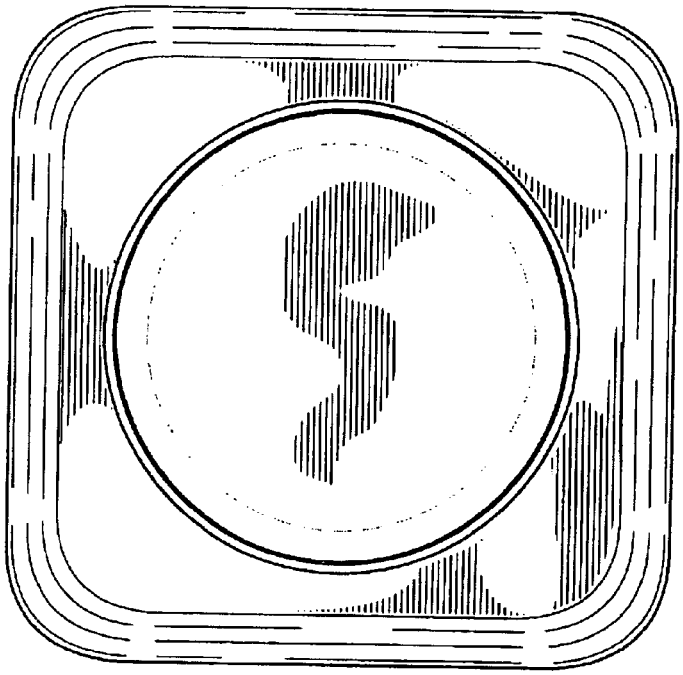
FIG. 4 is a bottom view of the container illustrated in FIG. 1.

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.